Jan. 7, 1930.   L. A. WILSON   1,742,456
BALANCED FLOW CONTROL DEVICE
Filed March 7, 1927
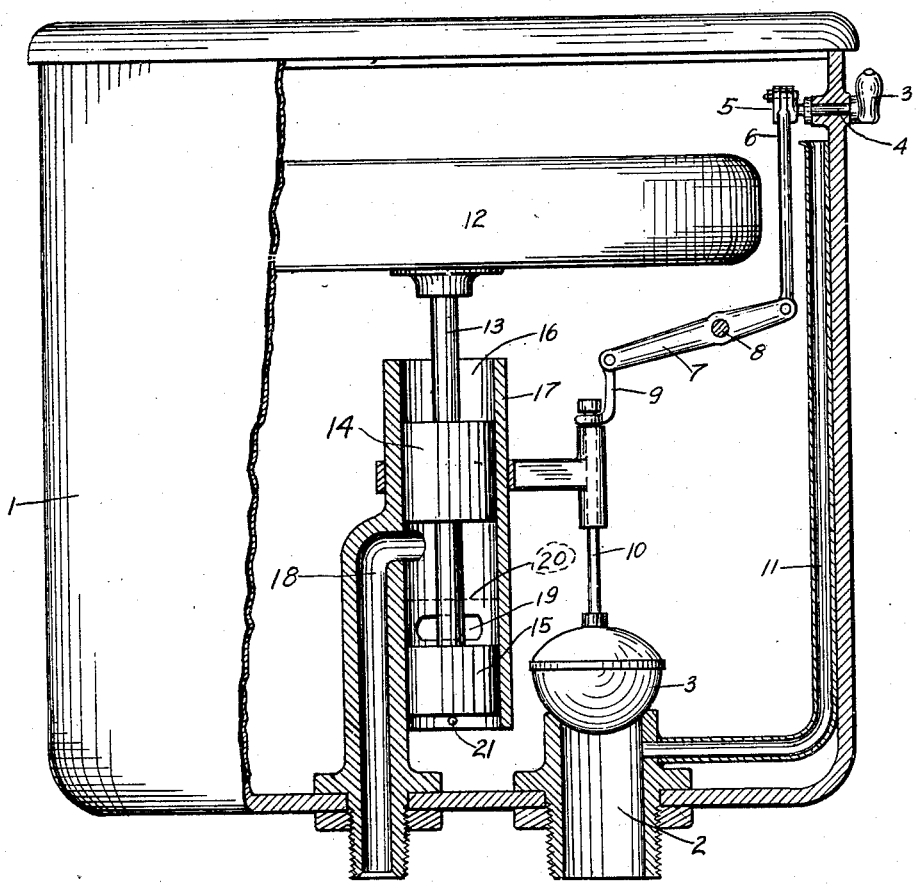
Leroy A. Wilson  INVENTOR.
BY
Murray O. Hayes  ATTORNEY.

Patented Jan. 7, 1930

1,742,456

UNITED STATES PATENT OFFICE

LEROY A. WILSON, OF SALT LAKE CITY, UTAH

BALANCED FLOW-CONTROL DEVICE

Application filed March 7, 1927. Serial No. 173,416.

This invention relates to a new and novel type of valve which utilizes the pressure of the fluid of which the flow is controlled thereby in such a way that regardless of the pressure the only force necessary to operate said valve is that required to move the weight thereof and overcome friction between said valve and the bore in which it operates.

The objects of my invention are:

First. To devise a valve which shall be balanced to overcome the effect of the pressure of the fluid in which it is used.

Second. To provide a cheap, simple, yet very efficient valve.

Third. To provide a valve having a large outflow orifice and yet requiring a minimum of time to close.

Fourth. To devise a valve which, when used in a water closet, shall be absolutely noiseless and due to its large outflow orifice may utilize a much smaller tank than is now necessary.

The single figure of the drawing illustrates the use of my novel valve in a water closet, a service to which it is particularly adapted.

In water closets as now constructed there is a very objectionable noise, due to the restricted valve orifice through which the water flows into the tank. Due to the fact that the valve which controls the flow of water through said orifice must operate against the pressure of the water, it is necessary to restrict the area of the orifice; a complicated system of compound levers is necessary to close the valve against the pressure, which necessitates slow closing and slow opening; and due to the restricted outflow orifice from the valve it is necessary that the tank contain substantially the entire quantity of water requisite for flushing. All these factors make for expense of construction and render noiseless action almost unattainable. It is to overcome these objectionable features that I have made the present invention.

The numeral 1 designates a flush tank of the conventional type having an outlet passage 2 controlled by a ball valve 3 which is operated through the customary mechanism of a handle 3 on a shaft 4 to the other end of which is connected arm 5, which in turn is pivotally connected to link 6; the said link is pivoted to one end of lever 7 which is pivotally mounted at 8 and to the other end of which is pivoted link 9 which has slidable relation with stem 10 of ball valve 3, all of which is well known and forms no part of my invention. The customary overflow duct is indicated by 11.

Instead of the complicated and slow acting system of levers connected with the float in the devices at present used I provide a float 12 connected directly to the stem 13 of my novel valve. This stem 13 carries two piston-like members or heads which are spaced from each other and are designated by 14 and 15 respectively. Float 12 is made with a large surface area transversely of stem 13 whereby a large buoyant force is developed by a small change in water depth, making a quick acting lift.

The said heads have a snug but readily slidable fit in the bore 16 of a sleeve 17. An orifice 18 admits water to bore 16 between heads 14 and 15; inasmuch as the said heads are of equal diameter the fluid pressure on each will be the same, but since it will operate in opposite directions on the two the two forces due to said pressure will be balanced and consequently the valve will at all times operate with equal facility, regardless of pressure.

The outlet orifice 19 is of large size and is so situated that as soon as the drop of the fluid level in tank 1 permits float 12 to drop a distance equal to that from dotted line 20, which indicates the position of the upper face of head 15 when in the closed position, to the bottom of said orifice 19 the said orifice permits the efflux of a stream of water which, added to that in the tank, makes up the requisite quantity; it is thus apparent that since a large volume of water is supplied during the emptying of the tank 1 the size of said tank may be very much decreased.

A stop 21 is provided to prevent excessive downward movement of the valve.

It is to be noted that, unlike the valves now in use, there is no closing of orifice 19 until the water has practically reached its maximum elevation in tank 1, as float 12 is maintained near that level even when tank 1 is completely empty. Thus the cut off is rapid and absolutely noiseless. No more force is required to be exerted by float 12 than that sufficient to lift the very small weight of the valve and to overcome the almost negligible friction between heads 14 and 15 and the walls of bore 16, as the fluid pressures are perfectly balanced except the entirely negligible difference in pressure due to the lower face of 15 being at slightly greater depth than the upper face of 14.

A valve constructed according to this invention has been in use for some time where the water pressure is unusually great, but nevertheless it functions perfectly and gives an absolute shut-off of the water.

Its cheapness of production, its entire lack of anything to get out of order and its smooth, noiseless operation make this valve preeminently adapted for the use specified and illustrated here, but it is of almost universal application in handling all sorts of fluids including compressed air, steam, heavy petroleum crudes, etc.

It is obvious that there will be no lateral pressure on my valve, tending to bind the valve against the wall of the bore as would be the case if the inflow orifice were covered by a head on the valve.

I claim:

1. A fluid flow controlling device comprising a member provided with a bore therein, an intake orifice and an outlet orifice into said bore spaced from each other, and means movable in said bore, said means being provided with portions whereon the pressure of a fluid whereof the flow is controlled by the said device will exert equal and oppositely directed forces, the intake orifice being always open.

2. A fluid flow controlling device, comprising a member provided with a bore therein, an intake orifice and an outlet orifice into said bore spaced from each other longitudinally of said bore, and a valve in said bore, said valve having spaced apart enlarged portions and being movable whereby an enlarged portion may close the outlet orifice, and the said enlarged portions having equal effective areas upon which will be exerted the pressure of a fluid flowing through the said controlling device, the intake orifice being always open.

3. A balanced valve comprising a casing having a bore therein, a stem having spaced enlargements slidably fitting in said bore, orifices opening into said bore, one of said orifices through which fluid enters said bore being always open, and one through which fluid leaves said bore being closable by one of said enlarged portions.

4. A valve construction comprising a casing having a bore therein, a stem provided with spaced enlargements slidable in said bore, and inlet and outlet orifices opening into said bore, the said enlargements having equal effective areas and being subjected to fluid pressure on their facing ends only.

LEROY A. WILSON.